Patented May 14, 1940

2,200,526

UNITED STATES PATENT OFFICE 2,200,526

AGE RESISTOR

William D. Wolfe, Cuyahoga Falls, Ohio, assignor to Wingfoot Corporation, Wilmington, Del., a corporation of Delaware No Drawing. Application September 12, 1936, Serial No. 100,544

11 Claims. (Cl. 260—808)

This invention relates to a method of preserving rubber and other organic materials of unsaturated nature from deterioration on ageing. More particularly, it relates to age resistors or antioxidants for rubber and to rubber treated with these substances.

By treatment of arylene diamines with formaldehyde and an agent yielding sulphurous acid, such as sodium bisulfite, salts of N-methyl arylene diamine omega sulfonic acids are obtained. This reaction has been described in Beilstein, XIII, page 83. It has now been found that age-resistors can be prepared from these omega sulfonic acids, either by treating the salt to remove the basic radical and yield the acid, or by treating the salt with an alkali to produce methylol derivatives, the compound, in either case, being an omega-substituted N-methyl arylene diamine. These compounds constitute age-resistors for rubber and other deteriorable organic materials.

The reactions involved in the preparation of the age-resistors are illustrated by the following examples in which p-phenylene diamine has been selected as the arylene diamine.

*Example 1*

One mol of p-phenylene diamine (108 grams) is dissolved in a mixture of 300 cc. of alcohol and 300 cc. of water by heating to 50° C. This solution is then treated with 30 grams (1 mol) of formaldehyde and 104 grams (1 mol) of sodium bisulfite in 400 cc. aqueous solution. Shortly, a dark brown stable liquid is formed which is filtered through activated carbon to yield an amber-colored solution. The reactions involved are as follows:

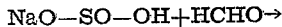

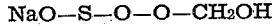

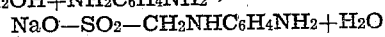

NaO—SO—OH+HCHO→
                         NaO—S—O—O—CH₂OH

NaOSO—OCH₂OH+NH₂C₆H₄NH₂→
                         NaO—SO₂—CH₂NHC₆H₄NH₂+H₂O

This intermediate product, which, as indicated, is a solution of the sodium salt of mono methyl p-phenylene diamine omega sulfonic acid, is divided into two equal portions and the separate portions respectively treated according to one of two procedures.

Thus, one portion is treated rapidly with 30 grams (0.5 mols) of acetic acid in 300 cc. of water. As soon as all of the acid has been added, the solution becomes filled with a white solid which is mono methyl p-phenylene diamine omega sulfonic acid, the free acid having been generated from the sodium salt by the acid treatment. This free acid is filtered out, washed with water and dried, giving a yield of 68.8 grams or 69% of the theory. The compound is characterized by melting at 171° C. with profound decomposition, is slowly soluble in dilute hydrochloric acid, and readily soluble in dilute sodium hydroxide and ammonium hydroxide. It is insoluble in benzene and in alcohol.

*Example 2*

The other half of the solution is treated with 20 grams (0.5 mol) of sodium hydroxide dissolved in 400 cc. of water. The solution soon fills with an almost white flocculent solid, which is considered to be the mono methylol derivative of the mono methyl p-phenylene diamine omega sulfonic acid, viz.,

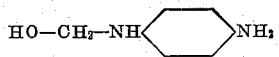

The dried product was obtained in a yield of 42.5 grams which is 61.5% of theory. It is soluble in dilute HCl, poorly soluble in sodium hydroxide, and insoluble in ammonium hydroxide. It is also insoluble in the usual organic solvents. The melting point is indefinite, softening occurring at about 120° C. but the compound remaining not fully melted at 250° C.

*Example 3*

The compound described above in Example 1 is a mono sulfonic acid but it is also possible to prepare the di omega sulfonic acid, the procedure being analogous to that employed in the preparation of the mono compound, except that two mols of sodium bisulfite and two mols of formaldehyde are employed for each mol of the arylene diamine. In this instance, the yield was 44% of theory and the compound, a pinkish powder melting at 186° C. with decomposition, is very soluble in sodium hydroxide solution, instantly soluble in aqueous ammonia, almost insoluble in hydrochloric acid, difficultly soluble in benzene and in alcohol. Its solubility characteristics, therefore, do not vary greatly from the corresponding mono omega sulfonic acid. Its formula is

*Example 4*

Correspondingly, the di methylol compound analogous to the mono methylol compound described in Example 2, is prepared by treating a solution of the sodium salt of the di omega sulfonic acid of Example 3 with sodium hydroxide. A yield of 17 grams of a pink powder is obtained, the same being readily soluble in dilute hydrochloric acid but being changed to white crystals by concentrated hydrochloric acid. It is slowly soluble in dilute sodium hydroxide, almost insoluble in acetic acid and insoluble in benzene and in alcohol. The compound softens at 116° C. but is not fully melted at 250° C. Its formula is

It will be apparent from the foregoing examples that the class of age resistors or antioxidants illustrated thereby may be termed omega-substituted N-methyl arylene diamines, either one or both amino groups being substituted by a methylene sulfonic acid radical or by a methylol radical. Thus, the class is represented by the general formula X—HN—R—NH—$X_1$, in which R is arylene and X and $X_1$ are $CH_2SO_3H$, $CH_2OH$ or H, at least one substituted methyl group being present. Other arylene diamines can be substituted, of course, for the phenylene diamine employed in preparing the compounds described in the examples, and reacted with formaldehyde and a bisulfite. For example, the phenylene diamine may be replaced by m-toluylene diamine and its isomers, the xylylene diamines, 1:4 naphthylene diamine and its isomers, benzidine, diamino diphenyl amine, diamino diphenyl methane, diamino phenol, etc. Thus, by reacting toluylene diamine with a sulfite and formaldehyde, appropriate changes in proportions and conditions of reaction being made, mono methyl toluylene diamine omega sulfonic acid, dimethyl toluylene diamine di omega sulfonic acid, mono methylol toluylene diamine and dimethylol toluylene diamine can readily be prepared. Likewise, the corresponding mono and dimethyl omega sulfonic acids, such as the mono- and di-methyl naphthylene diamine omega sulfonic acids, and the mono and dimethylol derivatives, such as the mono- and di-methylol naphthylene diamines, of the other arylene diamines mentioned, as well as of many not mentioned, can be prepared and used as age resistors.

The procedure employed in preparing the age resistors is capable of variation but, in general, equimolecular proportions of the various reactants will be employed, or a slight excess of one chemical or another may be present without affecting the result. The temperatures employed may vary from about 40° C. to 75–80° C. at least, higher temperatures being occasionally necessary to insure completion of the reaction, which ordinarily requires but a short time.

The preservative power of the compounds was tested by placing the same in rubber samples made up according to the following composition:

| | Parts by weight |
|---|---|
| Rubber | 100 |
| Zinc oxide | 5 |
| Sulfur | 3 |
| Hexamethylene tetramine | 1 |
| Stearic acid | 1.5 |
| Antioxidant | 1 |

The rubber stock was then cured and test pieces were aged in an oxygen bomb at a temperature of 50° C. under a pressure of 150 pounds per square inch for a period of six days. The following results were obtained:

| Cure in mins., °F. | Tensile before ageing | Tensile after ageing | T. R. |
|---|---|---|---|
| MONO METHYL P-PHENYLENE DIAMINE OMEGA SULFONIC ACID | | | |
| | | | Percent |
| 35/285 | 157 | 165 | |
| 50 | 188 | 190 | 104 |
| 70 | 200 | 214 | |
| MONO METHYLOL P-PHENYLENE DIAMINE | | | |
| 35/285 | 187 | 176 | |
| 50 | 164 | 186 | 106 |
| 70 | 178 | 198 | |

It will be noted that each compound was very effective in preserving the rubber from the effects of accelerated ageing in the oxygen bomb, the tensile ratio (T. R.), or ratio of tensile strength after ageing to tensile strength before ageing, showing no loss of strength.

The compounds described are also useful in preserving other materials of rubber-like nature, such as balata, gutta percha, synthetic rubber, reclaimed rubber, latex and the like, and the term "rubber" as used in the appended claims, is intended to embrace such rubber-like materials, as well as rubber itself. Further, the compounds may be used to preserve other organic materials of unsaturated nature which are subject to deterioration, such as gasoline, vegetable oils and the like. The age resistor may be incorporated in the rubber or other deteriorable material or it may be applied to the surface thereof or any other suitable means of treatment may be employed. Also, the age resistor may be employed in conjunction with other substances added to the rubber or other deteriorable organic matter, without altering its efficacy.

While there have been described above certain preferred embodiments of the invention, the same are intended as illustrative and no limitation is imported thereby. Accordingly, the invention is particularly pointed out and defined by the accompanying claims, in which it is intended to set forth all features of patentable novelty residing therein.

What I claim is:
1. A method of preserving rubber which comprises incorporating therein a mono N-methylene arylene diamine omega sulfonic acid.
2. A method of preserving rubber which comprises treating the same with an N-N'-dimethylene arylene diamine di omega sulfonic acid.
3. A method of preserving rubber which comprises treating the same with a mono N-methylene phenylene diamine omega sulfonic acid.
4. A method of preserving rubber which comprises incorporating therein an N-N'-dimethylene phenylene diamine di omega sulfonic acid.
5. A method of preserving rubber which comprises treating the same with mono N-methylene p-phenylene diamine omega sulfonic acid.
6. A method of preserving rubber which comprises incorporating therein N-N'-dimethylene p-phenylene diamine di omega sulfonic acid.
7. A method of preserving rubber which comprises treating the same with mono N-methylol p-phenylene diamine.
8. An age-resisting rubber composition comprising rubber and mono-N-methylene p-phenylene diamine omega sulfonic acid.

9. An age-resisting rubber composition comprising rubber and N-N'-dimethylene p-phenylene diamine di omega sulfonic acid.

10. A method of preserving rubber which comprises treating the same with a member of the group consisting of the N-methylene arylene diamine omega sulfonic acids and the N-methylol arylene diamines.

11. An age resisting rubber composition comprising rubber and a member of the group consisting of the N-methylene arylene diamine omega sulfonic acids and the N-methylol arylene diamines.

WILLIAM D. WOLFE.